(No Model.)

W. E. WILLEY.
EVAPORATOR.

No. 246,848. Patented Sept. 6, 1881.

WITNESSES
Fred. G. Dieterich
P. C. Dieterich

INVENTOR
W. E. Willey,
by C. A. Snow & Co.
Attorneys

N. PETERS, Photo-Lithographer, Washington, D. C.

UNITED STATES PATENT OFFICE.

WILFORD E. WILLEY, OF NUNDA, NEW YORK.

EVAPORATOR.

SPECIFICATION forming part of Letters Patent No. 246,848, dated September 6, 1881.

Application filed July 1, 1881. (No model.)

*To all whom it may concern:*

Be it known that I, WILFORD E. WILLEY, of Nunda, in the county of Livingston and State of New York, have invented certain new and useful Improvements in Evaporators; and I do hereby declare that the following is a full, clear, and exact description of the invention, which will enable others skilled in the art to which it appertains to make and use the same, reference being had to the accompanying drawings, which form a part of this specification.

My invention relates to an evaporator or fruit-drier adapted to serve on a kitchen stove or furnace and receive its heat therefrom; and the novelty consists in the construction and arrangement of parts, as will be more fully hereinafter set forth, and specifically pointed out in the claims.

The object of the invention is to produce an evaporator which will serve efficiently and conveniently for the desired purpose, one readily and easily managed, and one that will not injure the fruit being treated; and to these ends the invention consists, essentially, in a rectangular box having inlet-apertures below for air, said inlets being controlled by sliding doors operating in guides, and an exit door or aperture upon the top, similarly controlled, through which the steam and gases from the drying fruit, &c., escape to the open air in the room. A series of screened shelves is provided, which operate on peculiar cleats or guides in such a manner that alternate shelves will approach close to or impinge upon one end, while the other ends will be arranged at a distance from the opposite end of the box, allowing the heat to pass upward through this space at one end of the lowest shelf, over the fruit upon the next shelf above, and so on until it escapes. Heat also permeates through the shelves and among the fruit, and the tortuous route or channel made by the alternate spaces is meant only to retain the heat until it gives off a maximum of its drying qualities in a minimum of space and a minimum of time. A thermometer conveniently placed in one of the sides indicates the temperature inside, and this temperature may be raised and lowered at will, as the thermometer indicates the necessity, by properly manipulating the doors. The shelves are put in through the front end of the box, which is provided with one or two sliding doors, one or both of which are provided with a suitable mica window, through which the contents may be viewed from the outside.

The invention is fully illustrated in the accompanying drawings, which form a part of this specification, and in which—

Figure 1:
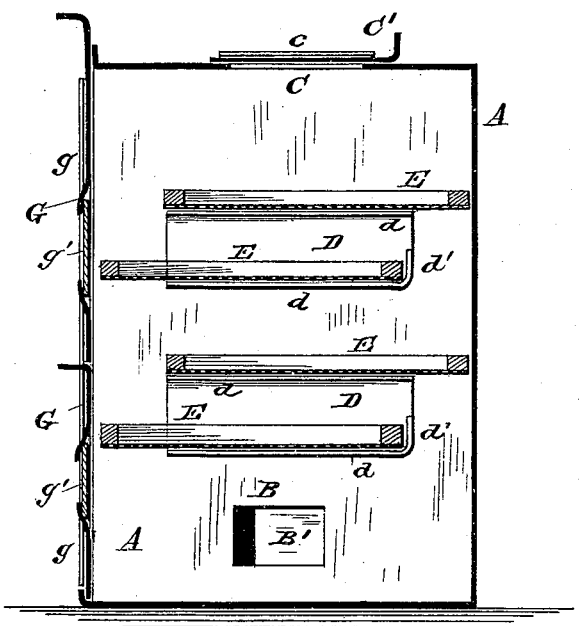
Figure 2:
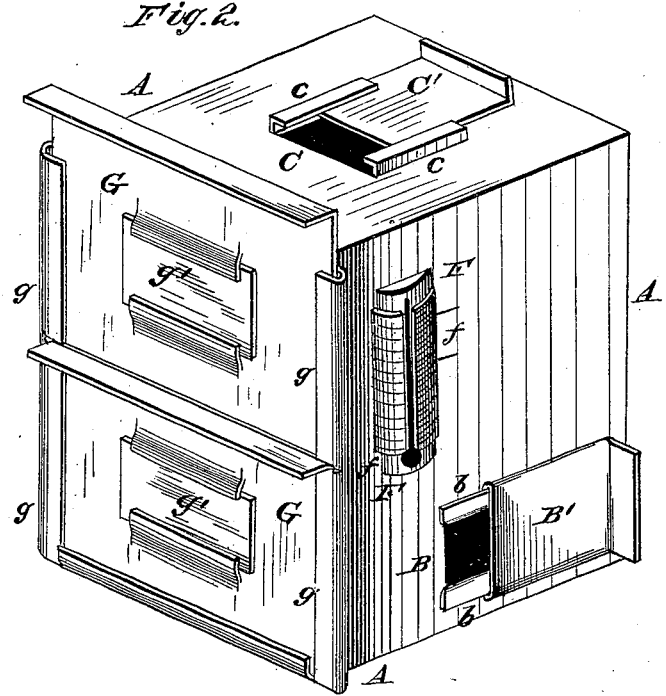

Figure 1 is a central vertical section, and Fig. 2 is a perspective view.

To enable others skilled in the art to make and use my invention, I will describe the construction and operation of the same, referring to the drawings, in which similar letters of reference indicate like parts in both the figures.

A represents the rectangular box or case, of sheet metal, having the front end open, and provided near the bottom, upon each side, with an air-inlet, B, controlled by a sliding door, B', working in guides b, and upon the top with an outlet-aperture, C, controlled by a sliding door, C', working in guides c. These doors allow the draft to be adjusted at will.

Formed of a single piece of sheet metal is a duplex cleat, D, the upper and lower edges, d, of which are turned in one direction, at right angles with the transverse plane of the same, to form supports for removable interchangeable screen-shelves E, upon which the fruit to be dried is placed. These cleats D are secured to the inner surfaces of the case A, and the inner end of the lower support in each piece is turned up to form a stop, d'.

F represents a thermometer, and f a scale, marked with degrees at which the fruit will be injured, &c., and from the indications of which the draft is adjusted by the doors C B to accommodate the heat to the condition of the fruit.

In guides g are operated the front doors, G, each having a mica window, g', through which the internal condition may be inspected.

The operation of the device is obvious.

I attach importance to the cleats D, in duplex form or having duplex bearings d, one of which operates as a stop to alternate the draft-spaces in the series of shelves.

Having thus described my invention, what I claim as new, and desire to secure by Letters Patent of the United States, is—

1. The cleats D, formed of a single piece of metal, and having duplex bearings $d$ and alternate stop $d'$, constructed and adapted to serve with a fruit-drier, substantially as described.

2. The fruit-drier herein described, consisting of the case A, having inlets B B' $b$ and outlets C C' $c$, the thermometric indicator F $f$, the cleats D $d$ $d'$, and the screened shelves E, and the window-doors G in guides $g$, the whole combined and adapted to operate substantially as and for the purposes set forth.

In testimony that I claim the foregoing as my own I have hereto affixed my signature in presence of two witnesses.

WILFORD ELI WILLEY.

Witnesses:
JAMES T. PAUL,
CHANCEY A. NORTON.